United States Patent [19]

Chen et al.

[11] Patent Number: 5,539,908
[45] Date of Patent: Jul. 23, 1996

[54] DYNAMICALLY LINKED AND SHARED COMPRESSION/DECOMPRESSION

[75] Inventors: Fetchi Chen; Daniel M. Dorrance, both of Boca Raton, Fla.

[73] Assignee: International Business Machines Corporation, Armonk, N.Y.

[21] Appl. No.: 428,783

[22] Filed: Apr. 21, 1995

Related U.S. Application Data

[63] Continuation of Ser. No. 981,040, Nov. 24, 1992, abandoned.

[51] Int. Cl.[6] ............................................. G06F 9/44
[52] U.S. Cl. .................................. 395/700; 395/154
[58] Field of Search ................................ 395/700, 650, 395/600, 154

[56] References Cited

U.S. PATENT DOCUMENTS

| | | | |
|---|---|---|---|
| 4,924,480 | 5/1990 | Gay et al. | 395/2.35 |
| 4,956,806 | 9/1990 | Crowe et al. | 364/DIG. 2 |
| 5,218,697 | 6/1993 | Chung | 395/650 |
| 5,247,681 | 9/1993 | Janis et al. | 395/700 |
| 5,371,885 | 12/1994 | Letwin | 395/600 |

*Primary Examiner*—Kevin A. Kriess
*Attorney, Agent, or Firm*—Bernard D. Bogdon

[57] ABSTRACT

This invention discloses a software mechanism for installing and identifying compression/decompression procedures thereby providing dynamic linking, while also supporting existing and future CODEC algorithms. The present procedure is a dynamically linked library installed as an entry in the system initialization file. Each entry is comprised of a four character code which uniquely identifies a file format, a compression type, and a compression subtype. Additional CODEC information in the entry of the system initialization file are the file name, the procedure name, the processing speed, and other attributes of compression algorithms. This method combined with the installed entry in the initialization file allows sharing of the same CODEC algorithm for different file formats and also provides for an existing application program to continue working, without modification, even at such time as when a new CODEC algorithm is added to the file format in a future installation.

9 Claims, 4 Drawing Sheets

DYNAMICALLY LINKED AND SHARED COMPRESSION/DECOMPRESSION

This is a continuation of application Ser. No. 07/981,040 filed on Nov. 24, 1992, now abandoned.

RELATED APPLICATIONS

The following U.S. patent application, which is assigned to the same assignee of this application (abandoned) and is hereby incorporated herein by reference, is related:

(1) "DATA PROCESSING FILE FORMAT TRANSPARENCY SYSTEM" Ser. No. 07/960,976, filed by D. M. Dorrance et al on Dec. 31, 1991.

BACKGROUND OF THE INVENTION

1. Technical Field

The present invention relates in general to improved multimedia computer systems, and in particular to systems and methods for processing multimedia applications utilizing installable compression/decompression procedures sharing such procedures among different application programs and utilizing a unique identification procedure for the compression/decompression selection procedures which selection process appears transparent.

2. Description of the Related Art

Current software that provides runtime libraries for data compression and decompression (CODEC) are either statically linked with the program before execution, or dynamically linked during execution at the request of the program. Static refers to those properties that can be established before execution of a program, whereas dynamic relates to those established during execution. Certain disadvantages are associated with either linkage. The static linkage causes a larger program size due to the duplication of CODEC routines which are identical. This obviously adversely impacts disk space and memory requirements, especially as additional CODEC methods are developed. The dynamic linkage, although saving disk space, is hardcoded for some specific library names, and therefore is limited to the existing runtime libraries.

SUMMARY OF INVENTION

This invention provides a software mechanism for installing and identifying CODEC procedures, thus providing the advantage of dynamic linking, while also supporting existing and future CODEC algorithms without explicitly coding library names within the application or input/output procedure.

The present innovative procedure for handling the varied CODEC routines is a dynamically linked library (DLL) installed as an entry in the system initialization file. Each entry is comprised of a four character code (FOURCC) which uniquely identifies a file format, a compression type, and a compression subtype.

For the file format see the before identified related patent application (1). An example of the compression type is that set forth in the Joint Photographic Experts Group (JPEG) standards.

A compression subtype example is the Lossy or Lossless. Different lossy compression methods can be used to compress given video clips. In general, as the compression of the video data is increased (i.e., the less number of bytes are consumed per frame), the quality of the video suffers. Video data compression is most generally varied by adjusting the values of the set of thresholds employed to make decisions within any of the lossy compression methods. The ability to control the locations within the frame, where the video quality is degraded as compression is increased, is desirable to obtain a compromise between the obtained compression and video quality.

Additional CODEC information in the entry of the system initialization file are the CODEC DLL file name, the CODEC procedure name, the processing speed, and attributes of compression algorithms. This same CODEC algorithm (as for example the Run-Length Encoding algorithm) associated with different file formats (for example, PCX and OS/2 PM BITMAP (BMP)) can be installed as different entries in the initialization file with different FOURCC codes, but with the same CODEC DLL file name and CODEC procedure name. The application program can issue a Load CODEC Procedure API by specifying the FOURCC code, the compression type, and the compression subtype. This method combined with the installed entry in the initialization file allows sharing of the same CODEC algorithm for different file formats. After the CODEC procedure is loaded, the application communicates with the CODEC procedure through the standard message interface. See the identified related patent application (1) for further information on this process. This standard interface allows an existing application program to continue working, without modification, even at such time as when a new CODEC algorithm is added to the file format in a future installation.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Due to the existence of various file formats in the industry, it is not a simple task to develop application programs that read and write data from-and-to a file in any of the varied file formats. This is because every file format has its own structure. How to support numerous file formats without continually impacting the existing application programs has been an issue and has been resolved by the invention provided by the before identified related patent application (1). That invention identifies the unique FOURCC character code and ties it to a file format, for example, resource interchange file format (RIFF) and tag image file format (TIFF) installed at blocks 14 and 16, respectively, of FIG. 2, and picture exchange files (PCX) installable at the slots identified by the three bullet marks 15, and thereafter to an installable file I/O procedure which unwraps the file format and supports messages such as READ, WRITE, and SEEK, to access the data file.

There are two methods provided in that invention of related patent application (1) to locate the file I/O procedure and to tie it to the file to be opened. The first method is through the specification of the FOURCC code. This normally occurs when the application already knows the file format of the file. The second method is through the identification process which polls each file I/O procedure to see if it recognizes the file header and therefore file format. Whichever I/O procedure successfully recognizes the file format header, claims ownership of the file.

Figure 1:
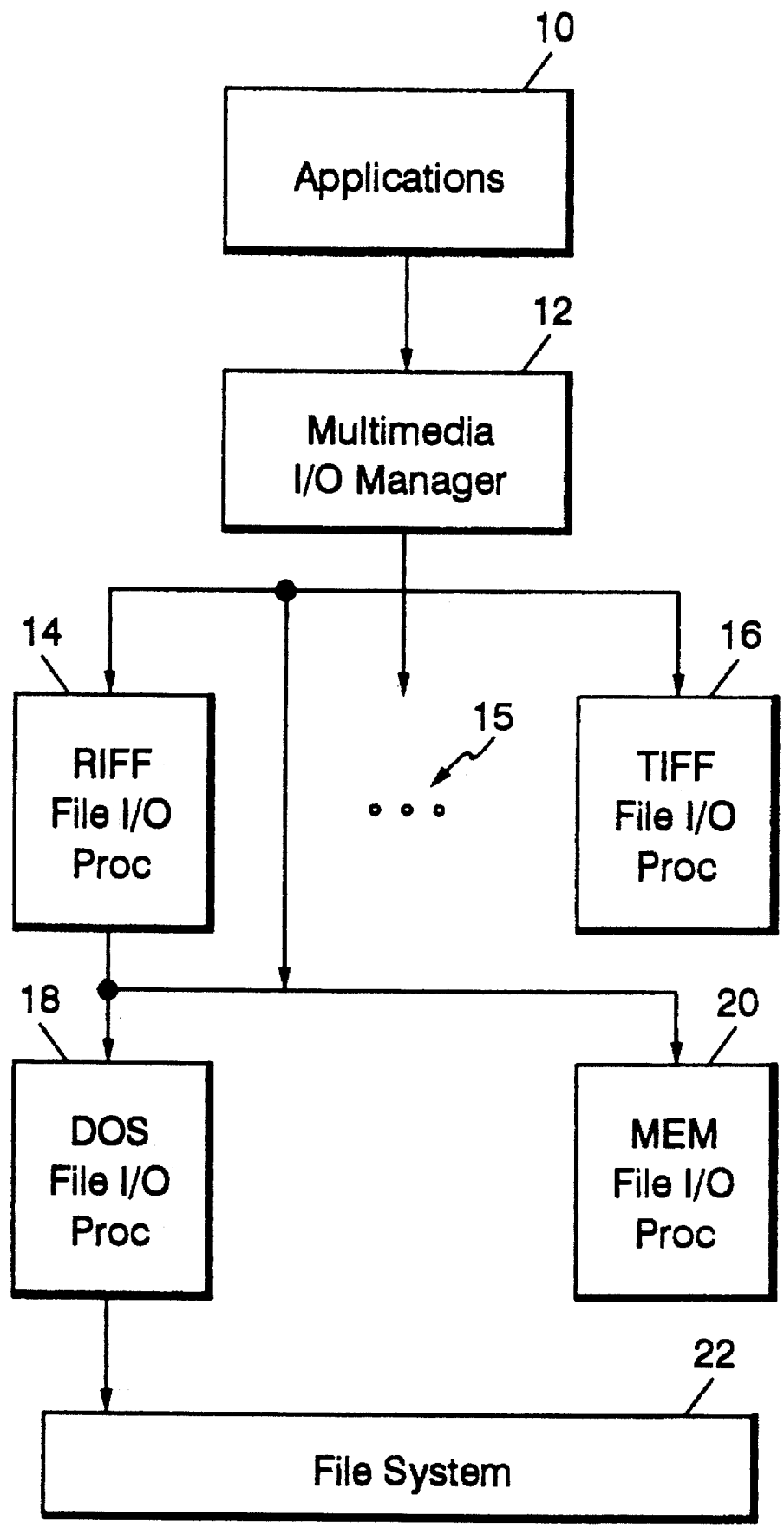
FIG. 1 is an illustration of the multimedia input/output managing system for file format transparency without installable compression/decompression procedures.

FIG. 1 illustrates the system architecture for the file format transparency. For each media type, which could include, among others, the IBM Storyboard Live product and the IBM OS/2 Bitmap, the data used by applications and I/O Procedures, is comprised of standard uncompressed data. This allows each application of block 10 of FIG. 1 to know what format the data will arrive in to the file system of block 22, independent of the original encapsulation of the data object, and in what formats the application is expected to supply the data to the file formats it supports. All variations and enhancements, such as data compression/decompression are handled within the I/O Procedure of blocks 14, 16, 18 and 20, as managed by the multimedia I/O (MMIO) manager 12. This isolates the knowledge of specific data representation inside the responsible I/O Procedure. An application of block 10 performs virtual data "reads" and "writes", expecting simple uncompressed information in a common form. The I/O Procedure of blocks 14, 16, 18 and 20 processes these requests, changing file data into interchange form on reads, and interchange data into file form on writes.

Data compression and decompression (CODEC) algorithms have been widely used in the industry, especially with multimedia applications, due to limited storage and communication bandwidth. The existing CODEC algorithms are implemented by being either embedded as part of the application program (or file I/O procedure), or as runtime libraries. As more and more file formats and CODEC algorithms are introduced to the industry, adaptability issues are brought into issue. First, duplication of the same CODEC algorithm in different file formats causes storage waste and maintenance difficulty. Second, newly defined CODEC algorithms cannot be easily supported without modifying the application programs of file I/O procedures.

To solve this problem, this invention defines an identifier to associate with a CODEC procedure at block 26 comprised of a four-character code, i.e. FOURCC, a compression type, and a compression subtype. The FOURCC character code determines the file format such as RIFF. The compression type determines the compression algorithm, for example, the Run-Length Encoding (RLE) algorithm. The compression subtype determines additional attributes of the compression algorithm, for example, Lossless or Lossy.

Figure 2:
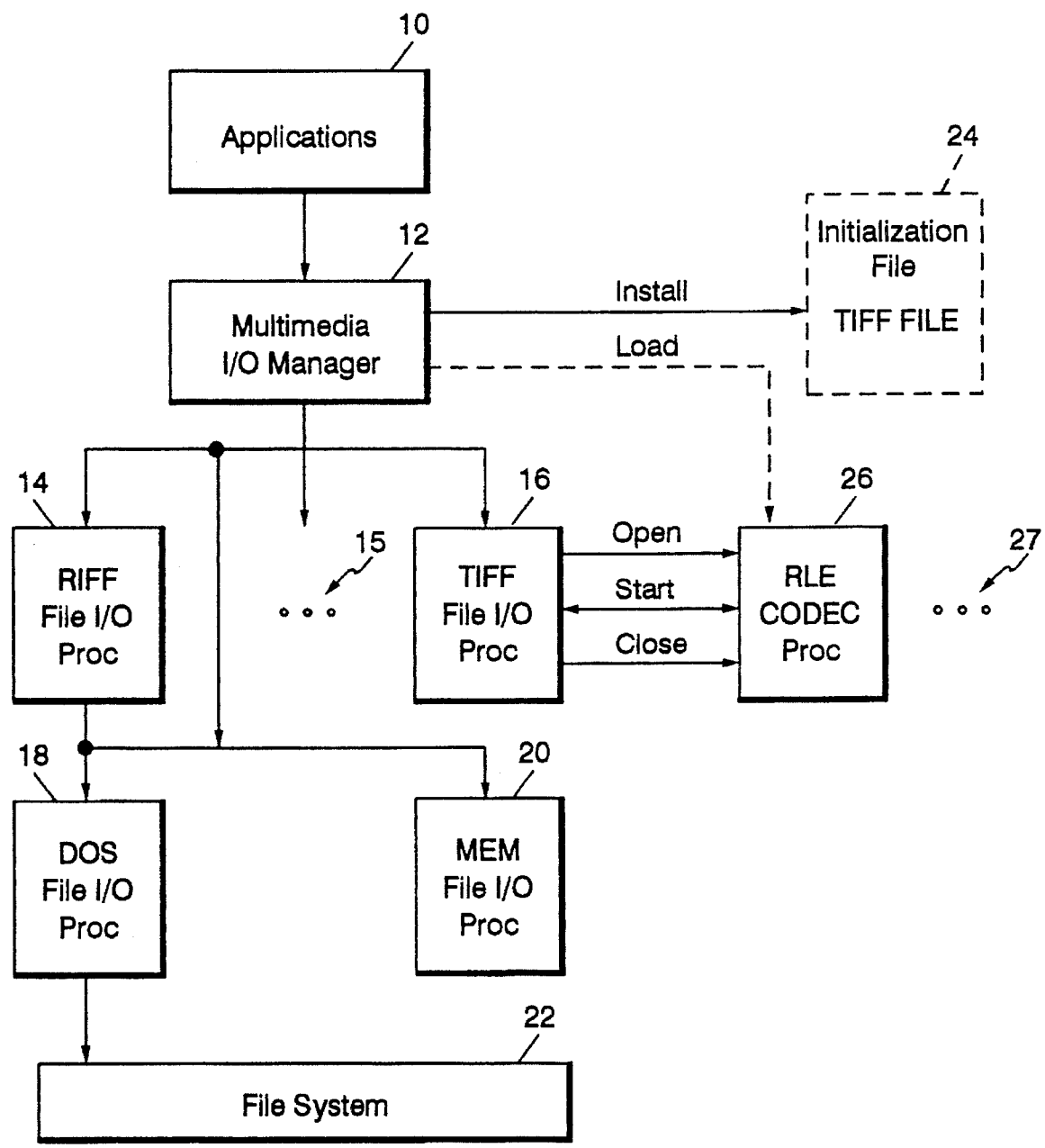
FIG. 2 is an illustration of the multimedia input/output managing system as illustrated in FIG. I with installed compression/decompression procedures according to the principles of the present invention to achieve CODEC transparency.

When a CODEC algorithm is installed in the system, the system initialization file, at block 24 in FIG. 2, in response to the install command from MMIO manager 12, may contain the following entries, as an example:

```
/* FOURCC COMP-TYPE COMP-SUBTYPE DLL-NAME
PROC-NAME SPEED OTHER ATTRIBUTES,,,*/
   "PCX" 1   0      RLE.DLL RLECODEC 100    0
   "BMP" 1   0      RLE.DLL RLECODEC 100    0
```

Figure 3:
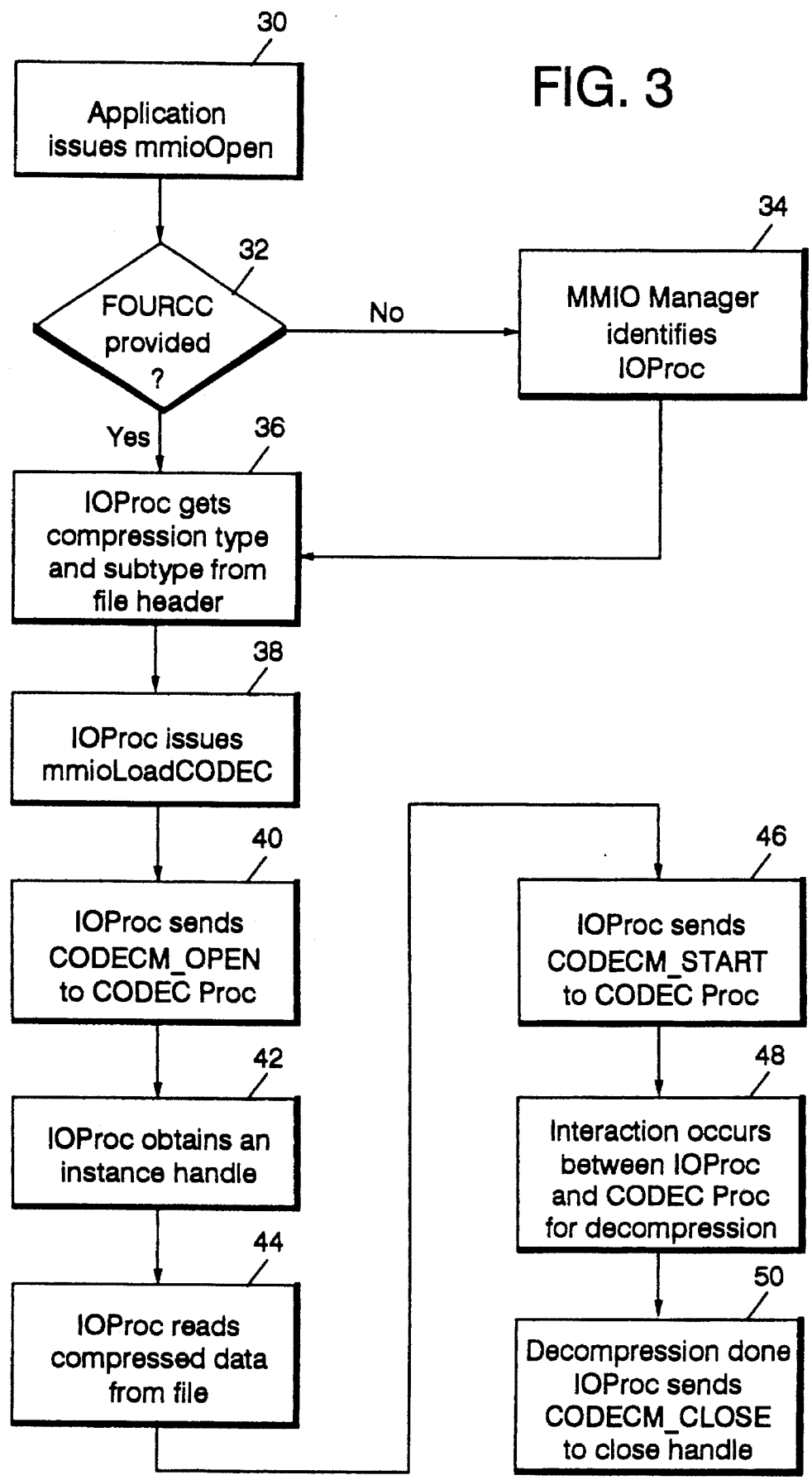
FIG. 3 is a logic flowchart for decompressing an existing file according to the principles of the present invention.

Notice that both entries in the initialization file contain the same CODEC DLL file name and procedure name. If the PCX or BMP file already exists on the disk, the logic flow for decompressing the file is described in the following way as illustrated in FIG. 3. The application program of block 10 of FIG. 1 issues the mmioOpen function to the MMIO Manager 12 at step 30. The file I/O procedure gets the control either by the provided FOURCC character code at step 32 or through the identification process from MMIO Manager at step 34.

The file I/O procedure extracts compression type and subtype (if it applies) from the file header at step 36 and issues the mmioLoadCODECProc function to MMIO manager 12 which loads (see FIB. 2) the CODEC procedure at step 38. The file I/O procedure sends the CODECM_OPEN message at step 40 to the CODEC procedure to obtain instance data at step 42. The file I/O procedure reads data from the file at step 44 and starts to decompress data by sending the CODECM_START message at step 46 to the CODEC procedure at step 48. The file I/O procedure finishes data decompression and sends the CODECM_CLOSE message to the CODEC procedure to close the handle at step 50, as illustrated in FIG. 3 by the bottom most line of command lines Open, Start and Close between blocks 16 and 26 of FIG. 2.

Figure 4:
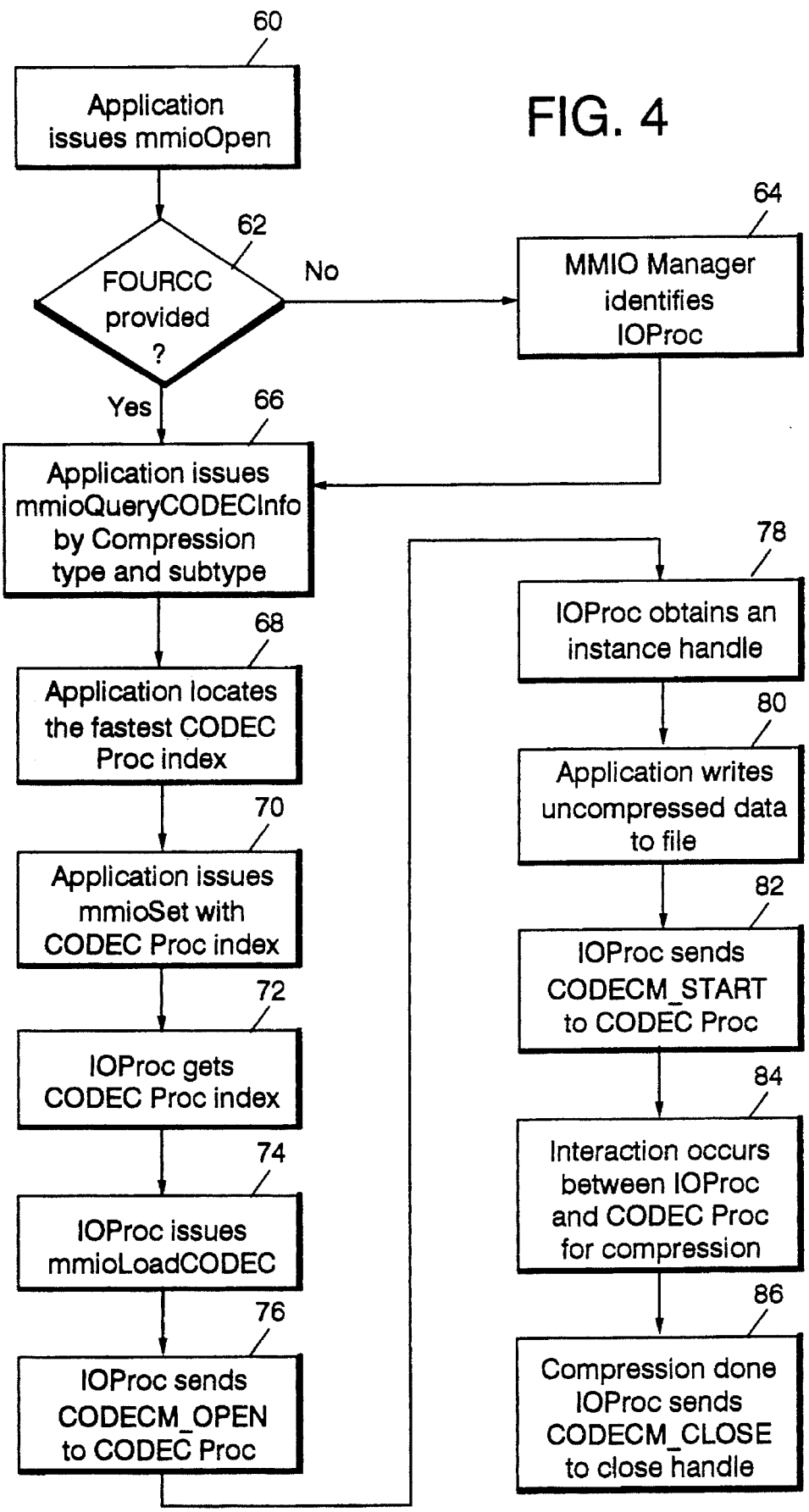
FIG. 4 is a logic flowchart for creating a compressed data file according to the principles of the present invention.

If the exemplary PCX or BMP file does not exist, the logic flow for creating a Run-Length Encoding compressed data file is in accordance with the following procedure as illustrated in FIG. 4. The application program at block 10 issues the mmioOpen function at step 60 to the MMIO manager 12. The file I/O procedure of blocks 14 and 16 gets the control either by the provided FOURCC character code at step 62 or through the identification process at the MMIO manager 12 at step 64. The application issues the mmioQueryCODECInfo at step 66 by providing the compression type and subtype to enumerate all RLE CODEC procedures at block 26 of FIG. 2 and locate the fastest CODEC procedure index at step 68. The application at block 10 issues the mmioSet to set the compression type, subtype (if it applies) and the fastest CODEC procedure index at step 70. The file I/O procedure at block 16 gets the compression type, subtype and the fastest CODEC procedure index at step 72 and issues the mmioLoadCODECProc function at step 74 to load the CODEC procedure. The file I/O procedure sends the CODECM_OPEN message to the CODEC procedure at step 76 to obtain an instance handle at step 78.

The application issues mmioWrite at step 80 to start writing uncompressed data to the file. The file I/O procedure gets data from the application and starts to compress data by sending the CODECM_Start message to the CODEC procedure at step 82. The file I/O procedure of blocks 14, 16, 18, and 20 issues another mmioWrite, this time to the Storage System I/O procedure gets data from the application and starts to compress data by sending the CODECM_Start message to the CODEC procedure at step 82. The file I/O procedure of blocks 14, 16, 18, and 20 issues another mmioWrite, this time to the Storage System I/O Procedure to write compressed data to the file 22 following step 84. The file I/O procedure finishes data compression and sends the CODECM_CLOSE message to the CODEC procedure to close the handle at step 86.

While the invention has been particularly shown and described with reference to a preferred embodiment, it will be understood by those skilled in the art that various changes in form and detail may be made therein without departing from the spirit and scope of the invention.

What is claimed is:

1. A computer implemented method for enabling a data processing system to support application software compression/decompression (CODEC) requirements, the method comprising the steps of:

installing a CODEC procedure in the data processing system;

identifying the CODEC procedure with a character code identifying attributes including file format for the CODEC procedure;

entering the character code identifying the installed CODEC procedure as an entry in an initialization file in the data processing system;

matching an application software attribute with a character code entry in the initialization file for an installed and identified CODEC procedure to identify a matched CODEC procedure required for the application software attribute; and loading the identified matched CODEC procedure required for the application software attribute in the data processing system independent of the application software.

2. A computer implemented method for enabling a data processing system to support compression/decompression (CODEC) requirements of application software, the method comprising the steps of:

storing CODEC procedures in a linked library as entries in an initialization file for dynamic accessing by the application software in the data processing system;

identifying each entry in the linked library with a character code identifying CODEC procedure attributes of each entry; and dynamically selecting one of the CODEC procedures from an entry in the linked library to carry out an application software requirement.

3. The method for enabling a data processing system to support application software CODEC requirements, as set forth in claim 1, wherein the step of identifying the CODEC procedure with a character code includes assigning a four character code for uniquely identifying each specific file format and compression attribute.

4. The method for enabling a data processing system to support application software CODEC requirements, as set forth in claim 3, wherein the step of identifying each specified file format and compression attribute includes identifying attributes or their combination, including compression type, compression subtype, CODEC library file name, CODEC procedure name and processing speed.

5. The method for enabling a data processing system to support CODEC requirements application software, as set forth in claim 2, further including the step of sharing of the CODEC procedures installed in the linked library by application softwares incorporating differing file formats such that a plurality of application softwares utilize the same CODEC procedure.

6. The method for enabling a data processing system to support CODEC requirements of application software, as set forth in claim 2, further including identifying each entry in the linked library with the character code comprising four characters and the step of dynamically linking the application software to one of the CODEC procedures in the absence of explicit CODEC procedure identification within the application software.

7. The method for enabling a data processing system to support CODEC requirements of application software, as set forth in claim 2, further including the steps of expanding the linked library to install another CODEC procedure installed subsequently to CODEC procedures initially installed.

8. The method for enabling a data processing system to support CODEC requirements of application software, as set forth in claim 2, wherein the step of identifying each installed CODEC procedure entry in the linked library includes identifying a different four character code identification and a CODEC procedure associated with different file formats, respectively, but with the same CODEC linked library file name and CODEC procedure name thereby providing for sharing of the same CODEC procedure for different file formats.

9. A computer implemented method for enabling a data processing system to support compression/decompression (CODEC) requirements of either a first or a second application software program during operation of one of the first or the second application software programs on the data processing system, the method comprising the steps of:

storing CODEC procedures in a linked library as entries in an initialization file for dynamic accessing by either the first or the second application software program in the data processing system;

identifying each entry in the linked library with a character code identifying CODEC procedure attributes of each entry;

dynamically selecting one of the CODEC procedures from an entry in the linked library to carry out a software requirement of either the first or the second application software program; and expanding during operation of said one of the first or the second application software programs on the data processing system the linked library to install another CODEC procedure installed subsequently to CODEC procedures initially installed for dynamic accessing by either the first or the second application software program on the data processing system.

\* \* \* \* \*